United States Patent
Keller et al.

(10) Patent No.: US 10,648,514 B2
(45) Date of Patent: May 12, 2020

(54) FRICTION CLUTCH DEVICE

(71) Applicant: Schaeffler Technologies AG & Co. KG, Herzogenaurach (DE)

(72) Inventors: Marion Keller, Bühl (DE); Sebastian Heuberger, Bühl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 180 days.

(21) Appl. No.: 15/744,971

(22) PCT Filed: May 23, 2016

(86) PCT No.: PCT/DE2016/200245
§ 371 (c)(1),
(2) Date: Jan. 15, 2018

(87) PCT Pub. No.: WO2017/020897
PCT Pub. Date: Feb. 9, 2017

(65) Prior Publication Data
US 2018/0209488 A1 Jul. 26, 2018

(30) Foreign Application Priority Data
Aug. 5, 2015 (DE) .......................... 10 2015 214 947

(51) Int. Cl.
F16D 13/58 (2006.01)
F16D 13/71 (2006.01)
F16D 125/58 (2012.01)

(52) U.S. Cl.
CPC ........... *F16D 13/585* (2013.01); *F16D 13/71* (2013.01); *F16D 2125/582* (2013.01)

(58) Field of Classification Search
None
See application file for complete search history.

(56) References Cited

U.S. PATENT DOCUMENTS 5,682,970 A * 11/1997 Sevennec ................. F16D 13/71
192/70.11
8,925,704 B2 * 1/2015 Okazaki .................... F16D 13/70
192/109 A
2004/0140173 A1 7/2004 Waldemar et al.

FOREIGN PATENT DOCUMENTS

CN 1130731 A 9/1996
CN 104736870 A 6/2015
(Continued)

OTHER PUBLICATIONS

EP 16 728 610.3 Annex Communication dated May 24, 2019.*
International Search Report for PCT/DE2016/200245; 3 pgs; dated Sep. 5, 2016 by European Patent Office.

*Primary Examiner* — Colby M Hansen
(74) *Attorney, Agent, or Firm* — Kevin L. Parks

(57) ABSTRACT

A structurally and/or functionally improved friction clutch device is disclosed. In particular, a servo spring for a clutch is to be provided which is suitable for series production. In particular, the servo spring is to be realized in the clutch while integrating already existing components. In particular, the servo spring is to keep a maximum disengaging force low. In particular, the servo spring is to operate only under worn conditions; in the new state and during separation it should be possible for it to be force-free. In particular, the total tolerance in the friction clutch device is to remain small, so that the susceptibility of the servo spring force to tolerance deviations is limited.

9 Claims, 2 Drawing Sheets

(56) References Cited

FOREIGN PATENT DOCUMENTS

| | | | |
|---|---|---|---|
| DE | 1907248 | U | 12/1964 |
| DE | 1983849 | U | 4/1968 |
| DE | 3441504 | A1 | 5/1986 |
| DE | 4132349 | A1 | 4/1992 |
| DE | 19709454 | A1 | 9/1997 |
| DE | 4132349 | A1 | 4/1999 |
| DE | 102012218876 | A1 | 5/2013 |
| DE | 10 2013 214372 | * | 1/2015 |
| EP | 2824346 | A2 | 1/2015 |
| FR | 2558549 | A1 | 7/1985 |
| JP | H716036 | U | 3/1995 |
| JP | H0716036 | U | 3/1995 |
| WO | 03087606 | A1 | 10/2003 |
| WO | 2014056495 | A1 | 4/2014 |
| WO | 2015010694 | A2 | 1/2015 |

* cited by examiner

FRICTION CLUTCH DEVICE

CROSS-REFERENCE TO RELATED APPLICATIONS

This application is the United States National Phase of PCT Appln. No. PCT/DE2016/200245 filed May 23, 2016, which claims priority to German Application No. DE 102015214947.1 filed Aug. 5, 2015, the entire disclosures of which are incorporated by reference herein.

TECHNICAL FIELD

The disclosure relates to a friction clutch device, in particular for a drivetrain of a motor vehicle propelled by an internal combustion engine. The friction clutch device has an axis of rotation, a housing, at least one contact plate, a first spring, at least one spacing element, and a second spring. The at least one contact plate is movable relative to the housing in the direction of extension of the axis of rotation for actuation between an engaged actuation position and a disengaged actuation position. The first spring to loads the at least one contact plate. The least one spacing element supports the first spring on the housing. The second spring reduces an actuating force. The second spring positioned between the housing and the first spring and is supported on the housing with a first support radius.

BACKGROUND

From DE 10 2012 218 876 A1 an actuating device for a friction clutch is known, having a clutch cover, a diaphragm spring supported directly or indirectly on the clutch cover so that it can swivel around a swivel area, in particular ring-shaped, to move a contact plate to press a clutch disk between the contact plate and a counter plate, a bearing spring supported directly or indirectly on the clutch cover to provide a counter bearing to disperse the forces of the diaphragm spring occurring at the swivel area, and a servo spring, in particular in the form of a diaphragm spring, positioned between the bearing spring and the diaphragm spring in the axial direction, the diaphragm spring and the servo spring being in contact with one another in at least two contact zones which are spaced apart from one another in the radial direction.

The servo spring reduces the consequences of a known effect, that with a diaphragm spring the necessary actuating force to swivel the diaphragm spring in order to move a contact plate increases sharply when the diaphragm spring rises. When friction linings provided between the contact plate and the counter plate to transfer torque frictionally to the clutch disk are in new condition, the contact plate travel distance to engage the friction clutch is still very short, so that the diaphragm spring cannot rise significantly. When the friction linings wear, the thickness of the friction linings decreases, which forces the contact plate to traverse a greater distance in order to engage the friction clutch and produce a frictional engagement with the clutch disk. This makes it necessary for the diaphragm spring to traverse a longer swivel distance so that the diaphragm spring is able to rise through elastic deformation, and accordingly the spring characteristic provided for the diaphragm spring would make an increased actuating force necessary to move the contact plate. This increased actuating force is counteracted by the servo spring. Thus, the servo spring ensures a low actuating force to move the contact plate, and an adequate contact force when engaging the friction clutch, over the life of the friction clutch.

From WO 2014/056495 A1 a friction clutch device is known, in particular for a drivetrain of a motor vehicle propelled by an internal combustion engine, having an axis of rotation, a housing, at least one contact plate which is movable relative to the housing in the direction of the axis of rotation for actuation between an engaged actuation position and a disengaged actuation position, a first spring to load the at least one contact plate and a second spring designated as a servo spring to reduce an actuating force in a locked state, the second spring being supported directly or indirectly at a first diameter on the housing and directly or indirectly at a second diameter on the first spring, the first diameter being smaller than the second diameter.

From WO 2015/010694 A2 a friction clutch device is known, in particular for a drivetrain of a motor vehicle propelled by an internal combustion engine, having an axis of rotation, a housing, at least one contact plate which is movable relative to the housing in the direction of extension of the axis of rotation for actuation between an engaged actuation position and a disengaged actuation position, a first spring to load the at least one contact plate and a second spring designated as a servo spring to reduce an actuating force, the second spring being supported with a first support radius and with a second support radius on the housing, and additionally on the first spring.

BRIEF SUMMARY

A structurally and/or functionally improved friction clutch device is disclosed. In particular, a servo spring for a clutch is to be provided which is suitable for series production. In particular, the servo spring is to be realized in the clutch while integrating already existing components. In particular, the servo spring is to keep a maximum disengaging force low. In particular, the servo spring is to operate only under worn conditions; in the new state and during separation it should be possible for it to be force-free. In particular, the total tolerance in the friction clutch device is to remain small, so that the susceptibility of the servo spring force to tolerance deviations is limited.

A friction clutch device is disclosed, in particular for a drivetrain of a motor vehicle propelled by an internal combustion engine, having an axis of rotation, a housing, at least one contact plate which is movable relative to the housing in the direction of extension of the axis of rotation for actuation between an engaged actuation position and a disengaged actuation position, a first spring to load the at least one contact plate, at least one spacing element to support the first spring on the housing, and a second spring to reduce an actuating force, which is positioned between the housing and the first spring and is supported on the housing with a first support radius, while the second spring is supported with a second support radius on a support ring which is supported, at least when the contact plate is in the disengaged actuation position, on the at least one spacing element. This keeps in particular a maximum disengaging force low. In addition, the spacing elements have two functions, namely bearing the first spring and supporting the support ring, so that an integration of a servo spring into the clutch while integrating already existing components is realized.

In particular, the second spring is supported with its second support radius directly on the support ring, that is, by contact.

The support ring can be supported in the direction of extension of the axis of rotation on the at least one spacing element, at least when the contact plate is in the disengaged actuation position. A support ring in the direction of extension of the axis of rotation is able to support the forces transmitted by the second spring to the support ring especially effectively. The support ring can also be supported in the direction of extension of the axis of rotation on the at least one spacing element when the contact plate is in the disengaged actuation position, in particular when the friction clutch device is in new condition. The support ring can also be supported in the direction of extension of the axis of rotation on the at least one spacing element when the contact plate is in the engaged actuation position.

The friction clutch device may have at least two spacing elements. The friction clutch device may have at least three spacing elements. The friction clutch device may have exactly three spacing elements. The support ring may have at least two support contours. The support ring may have at least three support contours. The support ring may have exactly three support contours. Each of the support contours is preferably supported on one each of the spacing elements.

The drivetrain may have an internal combustion engine. The drivetrain may have a torsional vibration damper. The drivetrain may have a transmission. The drivetrain may have at least one drivable wheel. The friction clutch device may be positionable in the drivetrain. The friction clutch device may be positionable between the internal combustion engine and the transmission. The friction clutch device may be positionable between the torsional vibration damper and the transmission.

The friction clutch device may have an input part. The friction clutch device may have an output part. The friction clutch device may have a housing. The housing may also be referred to as a cover. The input part may be drivable with the help of the internal combustion engine. The transmission may be drivable with the help of the output part. The friction clutch device may enable driving off, as well as changing a transmission ratio.

The friction clutch device may have a single clutch. The friction clutch device may have a dual clutch. The friction clutch device may have a dry clutch. The friction clutch device may have a wet clutch. The friction clutch device may have a single plate clutch. The friction clutch device may have a multiple plate clutch. The friction clutch device may have a self-disengaging clutch. The friction clutch device may have a self-engaging clutch. The friction clutch device may have a push clutch. The friction clutch device may have a pull clutch. The friction clutch device may be operable with the help of a clutch pedal. The friction clutch device may be operable automatically.

The friction clutch device, starting from a completely disengaged actuation position, in which there is essentially no transmission of power between the input part and the output part, may enable an increasing mechanical transmission of power, depending on actuation, all the way to a completely engaged actuation position, in which there is essentially complete transmission of power between the input part and the output part, a transmission of power between the input part and the output part taking place by frictional engagement. Conversely, starting from a completely engaged actuation position, in which there is essentially complete transmission of power between the input part and the output part, a decreasing mechanical transmission of power may be enabled, depending on actuation, all the way to a completely disengaged actuation position, in which there is essentially no transmission of power between the input part and the output part. A completely engaged actuation position may be a closed actuation position. A completely disengaged actuation position may be an open actuation position.

The at least one contact plate and the housing may be connected to one another non-rotatingly. The friction clutch device may have at least one pressure plate. The at least one pressure plate and the housing may be firmly connected to one another. The friction clutch device may have at least one clutch disk with friction linings. The at least one clutch disk may be clampable between the at least one pressure plate and the at least one contact plate. The input part of the friction clutch device may have the housing, the pressure plate and the at least one contact plate. The output part of the friction clutch device may have the clutch plate.

The second spring may be supported through the support ring on the first spring only when wear is present, in order to reduce an actuating force. In particular through a modified constructional design of the support ring, the second spring may however also be supported on the first spring independent of wear, in order to reduce an actuating force. The second spring may be supported through the support ring on the first spring already in new condition, in order to reduce an actuating force. The second spring may be installed prestressed. The second spring may be prestressed in the axial direction between the housing and the support ring. The second spring may act on the first spring when support contours of the support ring are not in contact with the spacing elements. The friction linings of the clutch disk may be subject to wear when the friction clutch device is operated. The thickness of the friction linings may become reduced because of wear, and/or due to setting procedures. A reduction in the thickness of the friction linings may cause an increased pre-stressing force in the completely disengaged actuation position. The second spring may be supported on the first spring in a worn condition, in order to compensate for a wear-based increase in actuating force.

The friction clutch device may have a spring device. The spring device may have the first spring and the second spring. The first spring may also be referred to as a clutch spring or actuating spring. The second spring may also be referred to as a servo spring. The first spring may be a diaphragm spring. The first spring may be supported between a first inner edge of the housing and a second wire ring, with a third support radius. In a diagram in which actuation travel is plotted on an x-axis and actuation force is plotted on a y-axis, the first spring may have a rising characteristic curve with a local maximum, and a falling section. A force of the second spring may be directed against a force of the first spring. In a diagram in which actuation travel is plotted on an x-axis and actuation force is plotted on a y-axis, the first spring and the second spring may have a common total characteristic curve. The total characteristic curve may have a rising path with a local maximum and a falling section, where due to the force of the second spring the local maximum of the total characteristic curve has a reduced value compared to the characteristic curve of the first spring, and the falling section of the total characteristic curve has a reduced gradient compared to the falling section of the characteristic curve of the first spring. The spring device may apply pre-tension to the contact plate in the engaging direction.

The second spring may be supported on an inner edge on the housing corresponding to the first support radius. The second spring may be supported through the support ring and the spacing element on the housing, indirectly with the first support radius and directly with the second support radius. The housing may have support sections for supporting the second spring directly with the first support radius. These support sections may be formed with a radial inner edge of the housing. The inner edge may be a bead in the housing. The support sections may be formed with a conical inside surface of the housing. The support sections may serve to center the second spring. The first support radius may be smaller than the second support radius. The first support radius may be larger than the second support radius.

The friction clutch device may have spacing elements to support the first spring on the housing. The spacing elements may each have a pin-like shape. The spacing elements may each have a flat-head rivet shape. The spacing elements may each have a multiple-stepped shape. The spacing elements may each have two steps for axial fixing. The spacing elements may each have a step for fixing the first spring and/or the second spring. The spacing elements may each have a step for supporting the support ring.

The support ring may have a flat basic form, from which at least one support contour protrudes. The support ring may have a plurality of support contours. The support ring may have exactly three support contours. Three support contours offer a statically determined support. The number of support contours preferably corresponds to the number of spacing elements. The support contours of the support ring are preferably supported on one step each of a spacing element. The support ring may be centered by means of the spacing elements. The support ring may support the second spring. The support ring may be positioned radially inside of the at least one spacing element.

The support ring may be a first wire ring. A wire ring is an especially cost-effective embodiment of a support ring. The support ring may be a bent profile. The support ring may be a bent semi-finished part. Two ends of a wire bent into a support ring may be joined together, in particular welded or soldered. Two ends of a semi-fished part bent into a support ring may be joined together, for example welded. The support ring may have at least one support contour, which projects through the first spring for support on the spacing elements. At least one support contour may extend in the axial direction through at least one opening in the first spring. In this way, the support ring may be supported on the spacing elements, so that the latter fulfill an additional function. The first spring may have openings for the support contours of the support ring. The first wire ring may have support contours, which each project through the openings in the first spring for support on the spacing elements. The first spring may have openings for the support contours of the first wire ring. At least one support contour may extend in the axial direction through at least one opening in the first spring. In addition, the support ring may be centered in the radial direction through the openings. The support ring is preferably centered in the radial direction by the spacing elements. At the same time, the support contours and/or circular arc segments of the support ring may be supported in the radial direction on the spacing elements. A support ring of this sort, in particular a support ring in the form of a wire ring, can be produced simply and with close tolerances. The same is true of the second spring in the form of a diaphragm spring. The result is therefore a servo spring integration which is especially suitable for series production.

The spacing elements may each have a step for supporting the first wire ring. The first wire ring may have support contours which are supported on one step each of a spacing element. The spacing elements may each have a cross section with non-round portions. The spacing elements may each have a cross section with asymmetrical portions. The partially non-round or partially asymmetrical cross section may serve to align and/or center the first spring, the second spring, the first wire ring and/or the second wire ring. The spacing elements may each have a radial appendage. The radial appendages of the spacing elements may serve to support the second spring. The spacing elements may each be rivet-like, having a manufactured head and a driven head. The spacing elements may each be riveted to the housing. The spacing elements may each have a surface with chamfered portions. The spacing elements may each have a cross section with conical portions. The spacing elements may each have a cross section with ramp-like portions. The friction clutch device may have at least three spacing elements. The spacing elements may be distributed in the circumferential direction of the friction clutch device.

The second spring may be centered on the at least one spacing element, using centering means. The second spring may be centered on the at least one spacing element, by means of cutouts made on the outside diameter of the second spring. The second spring may be centered on three spacing elements, by means of three cutouts made on the outside diameter of the second spring. The cutouts may each be bounded by two bars. The second spring may be centered on the at least one spacing element, by means of bars made on the outside diameter of the second spring. The second spring may be a diaphragm spring. The second spring may have cutouts radially on the outside, which correspond to the spacing elements. The cutouts in the second spring may be bounded on the sides by bars.

In summary and expressed in other words, the disclosure describes a friction clutch device which reduces the disadvantage known from a conventional clutch without a wear adjustment device, that when the clutch is worn the diaphragm spring rises more strongly with the clutch in the engaged state, and the disengaging force thereby increases. In order to attenuate the increase in the disengaging force in the worn state, servo springs are known which counteract the more strongly rising diaphragm spring starting at a certain point. The friction clutch device according to the disclosure has an especially advantageous configuration of such a servo spring. According to the disclosure, a clutch is proposed whose swivel-supported diaphragm spring has, preferably in the radial direction of the clutch within a swivel support and/or the diaphragm spring centering, a wire ring protruding in the axial direction of the clutch. The wire ring is supported by means of its protrusions (support contours) on the area of the swivel support and/or of the diaphragm spring centering which is solidly attached to the clutch cover, which is formed in particular by a plurality of pins.

In the circumferential direction of the clutch, a servo spring lies between the protrusions on the circular arc segments of the wire ring connecting the protrusions. The servo spring lies above the wire ring on the pins, and is held thus in the axial direction. The servo spring is likewise supported on the diaphragm spring by means of the wire ring, which lies on the diaphragm spring. Furthermore, the servo spring is clamped between the inner side of the clutch cover (housing) and the wire ring. If the clutch is worn, the diaphragm spring rises so strongly when the clutch is in the engaged state that it not only comes into contact with the circular arc segments of the wire ring, but displaces the wire ring in the axial direction of the clutch toward the clutch cover, whereby the protrusions of the wire ring lift off from the area of the swivel support and/or of the diaphragm spring centering (pins) which is solidly attached to the clutch cover, and the servo spring is compressed. This compression results in a lessening of the increase in the disengaging force when the clutch is worn.

The servo spring preferably has centering means, by means of which it is centered on the area of the swivel support and/or of the diaphragm spring centering which is solidly attached to the clutch cover. This area preferably consists of diaphragm spring centering pins, while the clutch may preferably be designed as a pin coupling, or possibly even as a hook coupling.

The wire ring preferably has at least three support contours in the form of shaped beads, which may be supported axially downward on the pins, in particular each on one step of the pins. The servo spring may be designed as a force rim, which has at least three bars formed on the outside diameter for the centering. A base for the inner servo spring footing may be formed in the cover on the inside diameter (first diameter).

"May" designates in particular optional features. Accordingly, in each case there is an exemplary embodiment that has the particular feature or particular features.

The friction clutch device according to the disclosure provides a servo spring for a clutch which is suitable for series production. The servo spring is realized in the clutch while integrating already existing components. The servo spring keeps a maximum disengaging force low. With appropriate design, the servo spring may operate only in worn condition; in new condition and during separation it may be ineffectual. Total tolerance in the friction clutch device is small, so that the susceptibility of the servo spring force to tolerance deviations is limited.

BRIEF DESCRIPTION OF THE DRAWINGS

Exemplary embodiments will be described in greater detail below in reference the to figures. This description will yield additional features and advantages. Concrete features of these exemplary embodiments may depict general features. Features of these exemplary embodiments combined with other features may also represent individual features.

The figures show the following, schematically and by way of example.

DETAILED DESCRIPTION

Figure 1:
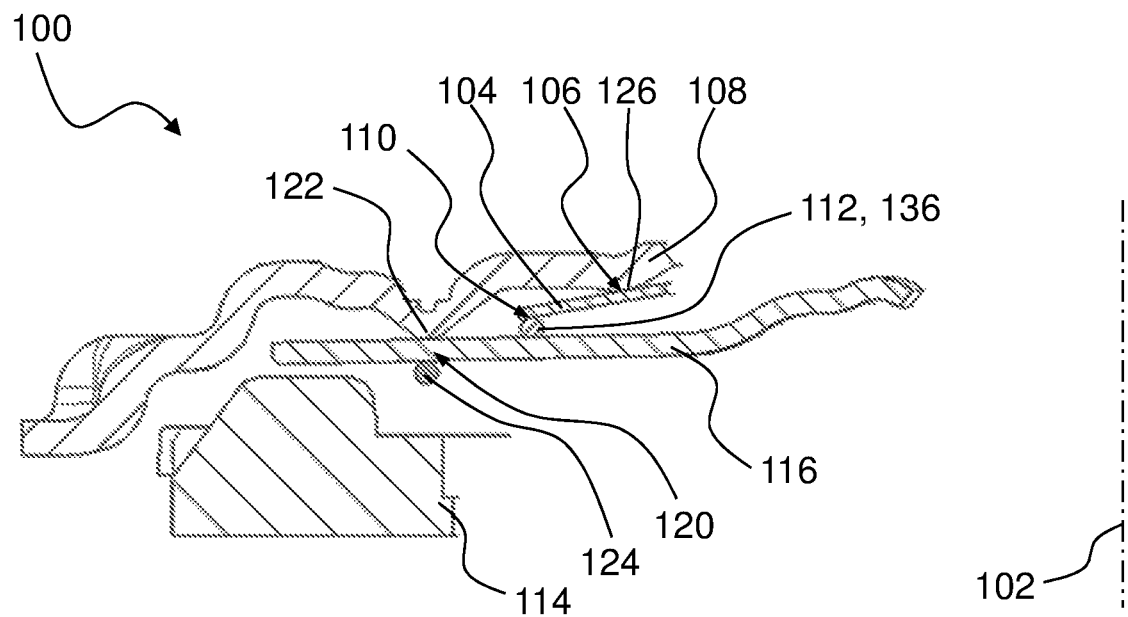
FIG. 1 depicts portions of a friction clutch device in a sectional view along line I-I in FIG. 4.
Figure 2:
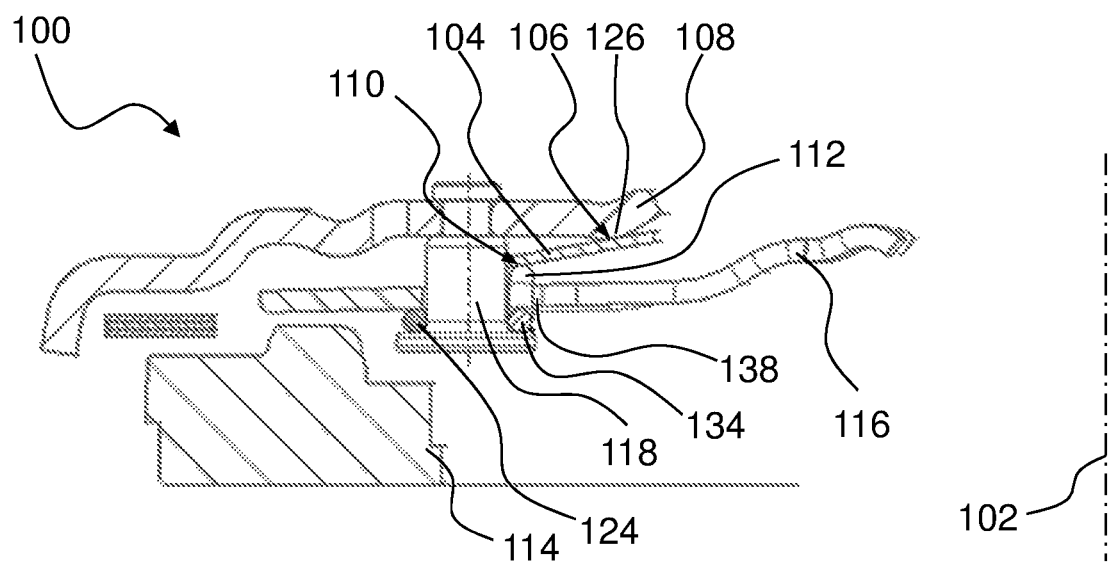
FIG. 2 depicts portions of the friction clutch device from FIG. 1 in a sectional view along line II-II in FIG. 4.

FIGS. 1 and 2 show portions of a clutch 100 which is rotatable around an axis of rotation 102, having a servo spring 104 which is supported with a first support radius 106 on a housing 108, and having a second support radius 110 on a support ring designed as a first wire ring 112. The directional specifications axial, radial, circumference and circumferential direction used below refer to the axis of rotation 102.

The clutch 100 is a friction clutch. The clutch 100 is a single-disk dry clutch. The clutch 100 is positionable in a drivetrain of a motor vehicle, between an internal combustion engine and a transmission. Between the internal combustion engine and the clutch 100 a torsional vibration damper may be positioned, in particular a dual-mass flywheel. The clutch 100 has an input part and an output part. The input part has the housing 108, a pressure plate which is firmly connected to the housing 108, and a contact plate 114 which is movable to a limited extent axially relative to the housing 108. The input part is drive-connectible to an internal combustion engine. The output part has a clutch disk with friction linings. The clutch disk is clampable between the pressure plate and the contact plate 114, in order to bring about a frictional mechanical transfer of power between the input part and the output part. The output part is drive-connectible to the transmission. The clutch 100 has an actuating device. With the help of the actuating device, the contact plate 114 is movable between a disengaged actuation position and an engaged actuation position.

The actuating device has a diaphragm spring 116 and the servo spring 104. The diaphragm spring 116 is also referred to as the first spring, and the servo spring 104 as the second spring. The contact plate 114 is pre-stressed in the engagement direction with the help of a force of the diaphragm spring 116. With the help of the actuating device, an actuating force to disengage the clutch 100 may be applied. An actuating force is opposed to the force of the diaphragm spring 116. The servo spring 104 is operative depending on wear of the clutch 100, in particular the friction linings of the clutch disk, or already in a new state independent of wear. A force of the servo spring 104 is opposed to the force of the diaphragm spring 116. The force of the servo spring 104 thereby supports an actuation of the clutch 100 in the disengagement direction, dependent on wear or independent of wear.

The servo spring 104 is likewise implemented as a diaphragm spring, and has a ring-disk-type form with an inside edge and an outside edge. The servo spring 104 is supported with the first support radius 106 on the housing 108 and with the second support radius 110 on the first wire ring 112. In particular, the servo spring 104 is supported with its second support radius 110 directly on the first wire ring 112, that is, by contact. The first support radius 106 is located radially farther inside than the second support radius 110. The first wire ring 112 is supported on the diaphragm spring 116 and additionally on spacing elements designed as spacing pins, like 118. As described in further detail below, the servo spring 104 is supported with its first support radius 106 directly, and with its second support radius 110 indirectly by means of the wire ring 112 and the spacing pins 118, on the housing 108.

The diaphragm spring 116 has a force rim and spring tongues. The force rim has a ring-disk-type form with an outer edge. The spring tongues extend radially inward starting from the force rim. There are intermediate spaces between all the spring tongues. The diaphragm spring 116 is supported with its force rim on the contact plate 114. The diaphragm spring 116 is swivel-mounted on the housing 108. The spacing pins 118 serve to support the diaphragm spring 116 on the housing 108. The spacing pins 118 each have a multiple-stepped cross section, with a first step and a second step. The spacing pins 118 each have a larger cross section on the second step than on the first step. The spacing pins 118 are fastened to the housing 108, and extend in the axial direction inward toward the contact plate 114. For the swivel mounting of the diaphragm spring 116, on the housing 108 on a third support radius 120 a support section, in the present case a first inner edge 122, is formed, on which the diaphragm spring 116 is supported, and a second wire ring 124 is positioned on the contact plate side of the diaphragm spring 116. The third support radius 120 is located radially farther outside than the second support radius 110. The second wire ring 124 lies on the second step of the spacing pin 118. The second wire ring 124 is positioned radially to the outside of the spacing pin 118. On the housing 108 at the first support radius 106 a support section is formed, in the present case a second inner edge 126, on which the servo spring 104 is supported.

Figure 3:
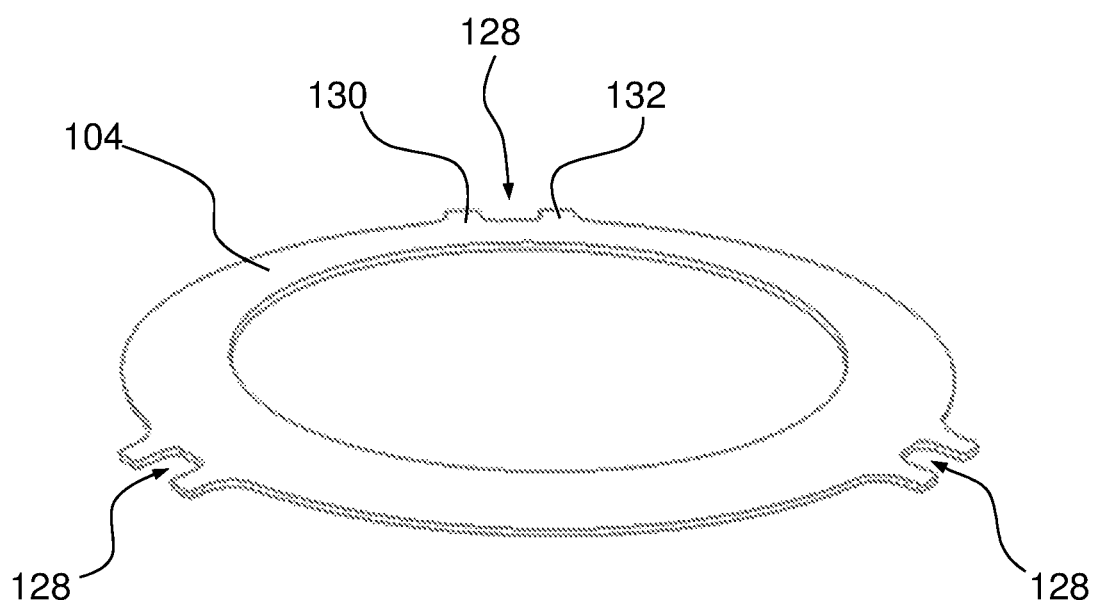
FIG. 3 depicts a servo spring of the clutch friction clutch device from FIG. 1 in a perspective view.

FIG. 3 shows a perspective view of the servo spring 104 implemented as a diaphragm spring. Radially to the outside, the servo spring has three cutouts like 128, distributed uniformly around the circumference. The distribution of the cutouts 128 around the circumference corresponds to the distribution of the spacing pins 118. The cutouts 128 are bounded on the sides by bars, like 130, 132. The servo spring 104 is positioned with its cutouts 128 at the spacing pins 118, while the bars 130, 132 surround the spacing pins 118 laterally. The servo spring 104 is centered and held in the circumferential direction by means of the cutouts.

Figure 4:
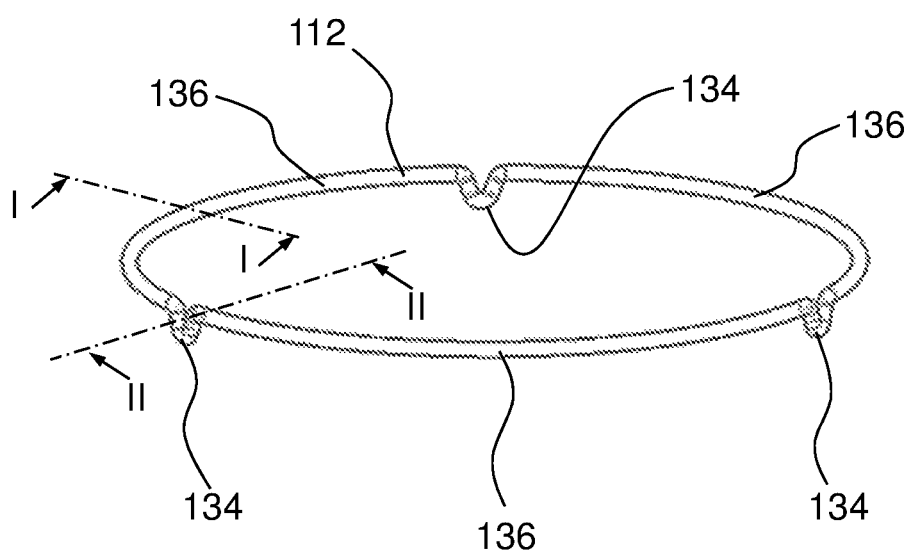
FIG. 4 depicts a first wire ring of the friction clutch device from FIG. 1 in a perspective view.

FIG. 4 shows a perspective view of the first wire ring 112. The first wire ring 112 serves as a support ring for the servo spring 104, and has a flat, circular basic form, from which three support contours 134 protrude in the axial direction. The three support contours 134 are distributed uniformly around the circumference of the first wire ring 112. The distribution of the support contours 134 around the circumference corresponds to the distribution of the spacing pins 118 and the distribution of the cutouts 128. Between each two adjacent support contours 134, a circular arc segment 136 is positioned. Three circular arc segments 136 and three support contours 134 complement each other to make the first wire ring 112. The circular arc segments 136 and the support contours 134 are formed in a single piece from one wire. The support contours 134 are each U-shaped. A support contour 134 is approximately semicircular, with rounded regions of transition to the adjacent circular arc segments 136. The support contours 134 stand perpendicular on a plane definable by the circular arc segments. The support contours 134 run in the axial direction away from the housing 108, starting from the circular arc segments 136.

The support contours 134 of the first wire ring 112 each project in the axial direction through an opening 138 in the diaphragm spring 116, on a side of the diaphragm spring 116 facing away from the circular arc segments 136. The support contours 134 may each lie on a second step of an assigned spacing pin 118. The support contours 134 are positioned radially to the inner side of the spacing pins 118. The servo spring 104 lies on the circular arc segments 136 of the first wire ring 112.

The servo spring 104 is braced between the housing 108 and the first wire ring 112. The diaphragm spring 116 is positioned on the side of the circular arc segments 136 facing away from the servo spring 104, and can come into contact with the circular arc segments 136 of the first wire ring 112. If the clutch is worn, when the clutch 100 is in the engaged state the diaphragm spring 116 rises so strongly that it not only comes into contact with the circular arc segments 136 of the first wire ring 112, but moves the first wire ring 112 in the axial direction toward the housing 108, whereby the support contours 134 of the first wire ring 112 lift off on the spacing pins 118 and the servo spring 104 is compressed. This compression results in a lessening of the increase in the disengaging force when the clutch 100 is worn.

REFERENCE LABELS 100 clutch
102 axis of rotation
104 servo spring, second spring
106 first support radius
108 housing
110 second support radius
112 first wire ring, support ring
114 contact plate
116 diaphragm spring, first spring
118 spacing pin, spacing element
120 third support radius
122 first inner edge
124 second wire ring
126 second inner edge
128 cutout
130 bar
132 bar
134 support contour
136 circular arc segment
138 opening

The invention claimed is:

1. A friction clutch device comprising:
an axis of rotation;
a housing;
at least one contact plate axially movable relative to the housing for actuation between an engaged actuation position and a disengaged actuation position;
a first spring for providing a load to the at least one contact plate and comprising an opening;
at least one spacing element to support the first spring on the housing;
a support ring, axially supported on the at least one spacing element in the disengaged actuation position, comprising:
a flat basic form; and,
at least one support contour protruding from the flat basic form, extending through the opening, and supporting the support ring on the at least one spacing element; and,
a second spring comprising a first support radius and a second support radius, wherein the second spring is:
arranged to reduce an actuating force;
positioned between the housing and the first spring;
supported on the housing at the first support radius; and,
supported directly on the support ring at the second support radius.

2. The friction clutch device of claim 1, wherein the support ring is axially supported on the at least one spacing element in the engaged actuation position when the friction clutch device is in a new condition.

3. The friction clutch device of claim 1, wherein:
the friction clutch device comprises exactly three spacing elements; and,
the support ring comprises exactly three support contours supported on respective spacing elements.

4. The friction clutch device of claim 1, wherein the support ring is positioned radially inside of the at least one spacing element.

5. The friction clutch device of claim 1, wherein the second spring is prestressed between the housing and the support ring.

6. The friction clutch device of claim 1, wherein:
the housing comprises an inner edge; and,
the first support radius is supported on the inner edge.

7. The friction clutch device of claim 1, wherein:
the second spring comprises an outside diameter and a plurality of centering elements;
the plurality of centering elements are cutouts or bars on the outside diameter of the second spring; and, the second spring is centered on the at least one spacing element by the plurality of centering elements.

8. The friction clutch device of claim 1, wherein the at least one spacing element is a stepped pin.

9. A drivetrain of a motor vehicle comprising:
an internal combustion engine; and,
the friction clutch device of claim 1.

\* \* \* \* \*